Jan. 2, 1940.　　A. G. DEAN　　2,185,975
TRACTOR UNIT
Filed May 4, 1937　　2 Sheets-Sheet 1
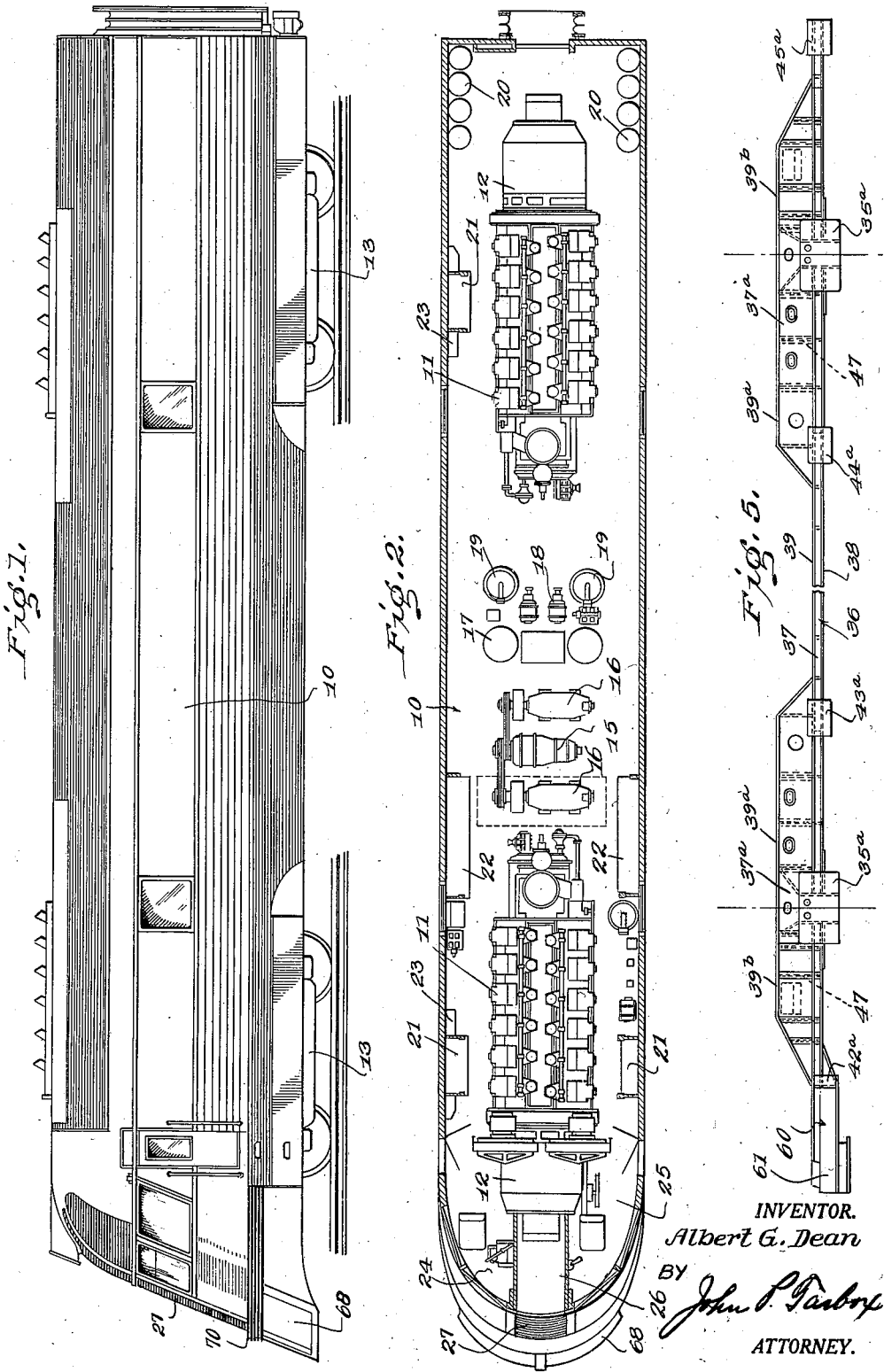
INVENTOR.
Albert G. Dean
BY
John P. Fairbox
ATTORNEY.

Jan. 2, 1940.　　A. G. DEAN　　2,185,975
TRACTOR UNIT
Filed May 4, 1937　　2 Sheets-Sheet 2
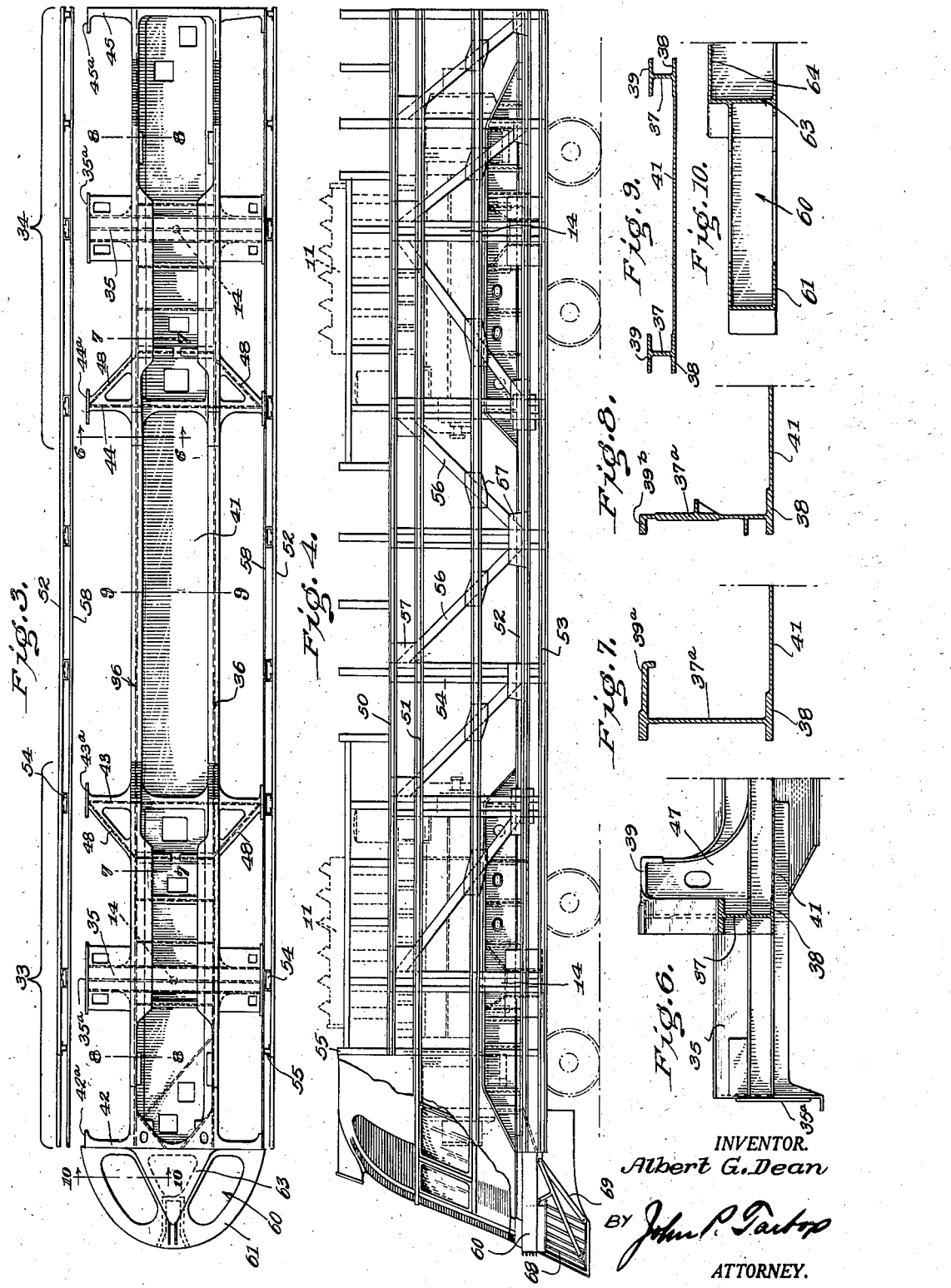
INVENTOR.
Albert G. Dean
BY John P. Tarbox
ATTORNEY.

Patented Jan. 2, 1940

2,185,975

UNITED STATES PATENT OFFICE 2,185,975

TRACTOR UNIT

Albert G. Dean, Narberth, Pa., assignor to Edward G. Budd Manufacturing Company, Philadelphia, Pa., a corporation of Pennsylvania Application May 4, 1937, Serial No. 140,591

13 Claims. (Cl. 105—414)

This invention relates to improvements in power units for rail cars and more particularly to an improved tractor unit having a dual power plant of the self-contained type.

The principal object of this invention is to provide a tractor unit in which a high ratio of available horse power per gross weight can be developed by the use of self-contained internal combustion engine power plants carried in an improved body structure having a very high strength-weight ratio.

A further object of the invention is to provide a tractor unit, the frame of which may be considered to have two substantially similar spaced, but dependent, sections each of which includes a combined underframe and power plant support structure on which the respective power plants are mounted, each structure and its power plant being balanced over its truck support with the respective sections of the tractor unit joined to resist longitudinally directed draft and buffing loads.

Another object of the invention is to provide an improved body structure of truss type for a dual power plant tractor unit in which the respective power plants are substantially balanced over their local supports.

Further objects and advantages of the invention will appear from the following disclosure of a preferred form of embodiment thereof taken in connection with the attached drawings, in which, Fig. 1 is a side elevation of a tractor unit of the rail car type adapted for dual engines;

Fig. 2 is a horizontal section through the rail car unit of Fig. 1 showing the power plant and accessories in plan;

Fig. 3 is a plan view of the power plant support and underframe structure with one side frame disassembled;

Fig. 4 is a side elevation withs parts in phantom view showing the relative location of the power plants with respect to the supporting trucks;

Fig. 5 is a side elevation of the underframe, and

Figs. 6 to 10 inclusive are transverse vertical sections on the lines 6—6 to 10—10 inclusive on Fig. 3.

Heretofore, tractor units for trains, as distinguished from unit cars, have been provided with large power plants and rather than exceed the practical weight limitations of minimum sized trucks, additional units have been used where additional power was required. In accordance with my invention, however, I attain a much higher power-weight ratio by which I can either increase the power without exceeding the desired operating limits, or by reducing the weight of the tractor unit, the available power is adequate for the preferred acceleration and speed conditions.

One form of embodiment to which my invention is particularly susceptible, includes a single continuous underframe having substantially similar sections with integral power plant supporting members on which the power plant is mounted, each section of the underframe and its power plant being substantially balanced over the respective supporting truck. Although the sections of the underframe are continuous, they are joined primarily to transmit longitudinal forces and side frame trusses of the necessary body structure support the relatively low unbalanced loads due to the auxiliary engine equipment. In this manner, each of the power plants may be of increased horse power capacity as the body load is greatly reduced, although without sacrifice of strength.

The power plants which constitute the principal loads of a tractor unit 10 each include a prime mover 11 and generator 12 and, as shown in Fig. 4, each power plant is mounted over a truck 13 with the center of gravity of the power plant substantially balanced over the king pin support 14 on the truck. The trucks are preferably of the power type, having suitable electric motors, not shown, for the desired tractive effort.

In addition to the power plants, is the auxiliary equipment which is diagrammatically illustrated to include the following: auxiliary motor generator set 15, air compressors 16, auxiliary fuel tank 17, fuel pumps 18, oil coolers 19, air tanks 20, control boards 21, battery compartments 22, sand boxes 23, etc. It is, of course, to be understood that the location of these auxiliaries is primarily for convenience but that they add to the load necessarily carried by the car body. The operator's cab is shown at 24 and the assistant operator's compartment at 25, being separated by the air intake tunnel 26. The air enters through grilles 27 and is distributed over the power plants in any well known manner.

The underframe is generally shown in Fig. 3 in plan and in Fig. 5 in elevation and is continuous throughout the length of the unit and constitutes a unitary base which is preferably built up of light, relatively thin steel plates suitably welded together and having the necessary angular reinforcements for rigidity. As shown in Fig. 3, it may be seen to have substantially similar sections 33 and 34 each of which is adapted to receive a power plant and each of which is characterized by the provision of a transverse bolster 35, which has provision for the king pin 14 for mounting on the truck 13.

Throughout its length, the underframe may be considered to consist of two continuous longitudinal beams 36 of generally I-section, the webs of which are indicated at 37, the lower flange at 38 and the upper flange at 39. In the central part of the underframe, the web is comparatively low and each beam serves primarily as a column although the respective beams are joined substantially throughout their entire length by a bottom plate 41 and as shown in Fig. 9, the cross section is substantially U-shaped with a low wide channel.

In the regions 33 and 34 which are relatively similar, the beam web 37a is quite high and in the prime mover section, the upper flange 39a extends inwardly a substantial amount as shown in Fig. 7. This is adapted to directly receive the prime mover structure. In the generator section, as shown in Fig. 8, the upper flange 39b extends outwardly to afford a substantial base for the generator.

The transverse members of the underframe, in addition to the bolsters 35, are the front end sill member 42, the forward needle beam 43, rear needle beam 44, and rear end sill member 45. Each of these members extends across the longitudinal beams 36 and is integrally formed therewith, such transverse members thus giving great rigidity to the underframe. In addition, transverse webs 47 are provided where necessary, as shown in Fig. 6, in the prime mover section, such webs being cut away and extending under the crank case as is well known. Other webs of a similar character, but of less extent, are also provided for the high web section 37a of the longitudinal beam in the power plant sections 33 and 34. Horizontal braces 48 are provided for the bolster beams 35, and in other places where strains are lower, gusseting of generous proportions is used.

As the bolster 35 extends across the respective sections 33 and 34 for a substantial balance of these sections, and as the power plants including the prime mover 11 and generator 12 are also substantially balanced with respect to the king pin or support point, it may be considered that the intermediate zone between needle beams 43 and 44 has no material bending moment. The beams in regions 33 and 34 are effective girders of substantial depth due to the requirements of supporting the parts of the power plant and the only vertical load between needle beams 43 and 44 is due to the auxiliary equipment and relatively small body loads. These loads are carried by the body.

The body framework is preferably of truss construction and, as shown in Fig. 4, the principal elements of a truss include the continuous upper chord members 50 and 51, lower chord members 52 and 53, all of which may be external mouldings attached to posts 54 and 55. Diagonals 56 are used, being joined to the posts and chords by gussets 57. In addition, a heavy internal plate 58 is provided at the bottom of the side frames, such plate serving as an intermediate thickness plate by which the side frames are secured to the underframe through flanged portions 42a on the front sill, portions 35a on the bolsters, portions 43a and 44a on the needle beams and portions 45a on the rear end sill. This plate is preferably welded to the side frames and riveted to the underframe due to the difference in materials.

These trusses not only serve as a basis for the body sheathing, and to support any relatively small unbalanced power plant loads and the floor loads of the auxiliaries between the needle beams 43 and 44, but by being rigidly attached to the transverse underframe members, they serve as longitudinal members at the side edges of the tractor unit, supplementing the longitudinal beams 36 to resist longitudinal loads. An unusually strong tractor unit is thus provided which has no unnecessary weight.

Forward of the front end sill member 42 is a downwardly and forwardly extended portion 60 which is integrated with the main portion of the underframe and constitutes a bumper. It is preferably of arcuate shape in plan view and thereby adapted to ward off obstacles with which the tractor unit may contact. The outer contacting wall includes a box or channel shape member 61 which ties in with the extremities of the front end sill member 42, such outer wall being also tied in with the intermediate parts of the underframe through the diagonal members 63 which are also preferably of a box cross section. The structure is more particularly shown in Fig. 10 in which it is to be noted that the central part is provided with a horizontal web 64. The entire bumper portion serves as the principal support for the operator's compartment 24 and 25.

The truss framework of the body also extends across the front of the car body, such structure being shown and described in a co-pending application Serial No. 74,542, filed April 15, 1936, Ragsdale et al., such structure being so arranged as to ward off obstacles and to distribute collision loads into the underframe. The entire front is preferably of generally rounded shape and of an upwardly and rearwardly inclined relation and may be characterized as of hoof-shape.

Below the bumper portion 60 and completing the front end construction, is the pilot 68, suitably braced to the underframe by braces 69. This pilot is also of curved form in plan and upwardly and rearwardly inclined to join in the underframe below the anti-climber 70.

The entire front end of the body thus serves as a continuous pilot. This, however, is merely a suitable form of structure, it being understood that other arrangements are possible and that the relations of the operator to the prime mover is of no material importance in view of the great weight of the prime mover. Substantial balance of the prime movers and underframe sections makes it possible to substantially increase the power plant size with a resulting increase of tractor effort.

While I have shown a preferred form of embodiment of my invention, I am aware that modifications may be made thereto and I, therefore, desire a broad interpretation of the invention within the scope and spirit of the disclosure herein and of the claims appended hereinafter.

What I claim is:

1. A multiple engine tractor unit of the class described, having an underframe with substantially duplicate engine bed portions, and a closed car body structure mounted on said underframe, said car structure comprising trussed side frame members, including vertical struts and longitudinal chords and tied strongly into the underframe in the region of the engine bed portions and adapted to take the vertical load stress between the two engine bed portions, the underframe between said engine bed portions being of decreased vertical depth and acting primarily to take longitudinal loads.

2. A light weight, high power tractor unit having an underframe consisting essentially of two similar power plant portions, power plants mounted thereon, supporting trucks mounted substantially under the center of gravity of the individual power plants and underframe portions, said tractor unit having longitudinal side frame trusses attached to the underframe, said trusses being adapted to take substantially all shear and bending movement of the tractor unit, and a substantial portion of the longitudinal stresses between the respective power plant portions, and a direct vertically shallow beam connection between the power plant portions to take longitudinal buffer and draft loads and transverse shear load.

3. A rail car tractor unit having dual power plants and adapted to be mounted on a plurality of trucks, said unit including an underframe having similar sections each of said sections having longitudinal power plant supports which constitute the principal longitudinal strengthening member of the section, bolsters substantially intermediate the ends of each of said sections, transverse end sill members projecting from the outer ends of the respective sections and needle beams projecting transversely from the opposite ends of the respective sections, said power plant supports being so located with respect to the bolsters that with the power plant in place, the center of gravity of each of the power plants and its respective section is substantially centered over the bolster, whereby the transmission of vertical stresses from one section to the other is substantially eliminated, side wall trusses secured to the bolster, end sill and needle beam ends to carry the vertical loads between said sections, and horizontal plate girder-like means in the plane of the sections arranged to carry longitudinal buffing and draft loads between the sections.

4. A rail car tractor unit having a plurality of power plants and adapted to be mounted on a plurality of trucks, which includes a unitary underframe, sections of which are similar, each of said sections having as main longitudinal members of the underframe longitudinal power plant supports spaced inwardly from the side walls of the unit, bolsters substantially intermediate the ends of each of said sections, said power plant supports being so located with respect to the bolsters that with the power plant in place, the center of gravity of each of the power plants and its respective section is substantially centered over the respective bolster, whereby the transmission of vertical stresses from one section to the other is substantially eliminated, the longitudinal power plant supports extending through from section to section but of decreased height between the sections and having a substantially horizontal plate girder interconnecting them between the sections and forming therewith a longitudinal beam intermediate the respective sections to take lateral shear loads and longitudinal draft and buffing loads.

5. A high powered, light weight tractor unit having two engines and an underframe of fabricated plate structure and having substantially similar sections on opposite sides of a vertical transverse plane through the longitudinal center of the underframe, each of said sections having longitudinal power plant supporting members and transverse members for securing said underframe to a body superstructure, one of said transverse members being a bolster, each of said bolsters being located vertically under the center of gravity of the respective power plants, the body superstructure having side wall trusses arranged to carry the main loading between said power plant supporting members.

6. A dual engine tractor unit comprising a unitary duplicate ended underframe adapted to be mounted on trucks, and a truss type body including side frames including upper and lower chord members and intermediate struts, said side frames constituting the principal intermediate vertical load carrying members, said underframe including longitudinal power plant supporting members extending from end to end of the underframe, supporting power plants adjacent the ends of the unit and constituting the principal longitudinal load resisting members, the intermediate portions of said members between said power plants being reduced in section to carry only a relatively small portion of the vertical loading in this region as compared with the vertical load carrying capacity of the side frame trusses.

7. A tractor unit supported from trucks, having an underframe and a body superstructure, said underframe adjacent said trucks including relatively rigid self-supporting power plant structures interconnected between the trucks by a structure adapted to take longitudinal buffer and draft loads but relatively minor vertical loads, said body superstructure, between said trucks being a relatively rigid member and adapted to supplement the underframe in said region to carry the main vertical loads between the rigid self-supporting structures.

8. A tractor unit supported from trucks, having an underframe and a body superstructure, said underframe adjacent said trucks including relatively rigid self-supporting power plant structures interconnected between trucks by a structure adapted to take longitudinal buffer and draft loads but relatively minor vertical loads, said body superstructure between said trucks being a relatively rigid member and adapted to supplement the underframe in said region to carry the main vertical load between the rigid self-supporting structures, and separate power plants carried by the rigid underframe portions 9. A tractor unit having dual power plants, an underframe therefor including a plurality of continuous spaced beams to receive the respective power plants adjacent their opposite ends, said beams in regions between the power plants acting merely as a column to take longitudinal loads, transverse bolster members spaced substantially under the centers of gravity of the respective power plants, needle beams connecting the inner ends of the power plant supporting portions of said beams, and side frame trusses secured to the ends of said bolsters and needle beams and taking the vertical loads of said unit between the bolster members.

10. A tractor unit including a body having trussed side walls extending from end to end of the unit and a unitary underframe comprising spaced beams arranged inwardly of the side walls of the body and also extending from end to end, said spaced beams being vertically shallow in their central portions and vertically deep in their end portions located over the supporting trucks, spaced transverse members connecting the beams in their vertically deep portions, said transverse members extending laterally to the body side wall trusses, the side wall trusses being connected to the outer ends of said transverse members to carry the major portion of the vertical loads between said end portions of the underframe.

11. An underframe for car tractor units having relatively rigid structures adjacent its opposite ends including a pair of vertically deep longitudinal beams for supporting a power plant and forming the main longitudinal members of the underframe and located inwardly of the side walls thereof and transverse bolster members interconnecting said beams and extended laterally therebeyond for securement to the body side walls, and transverse needle beams inter-connecting the inner ends of said power plant supporting beams and extending laterally therefrom for securement to the unit side walls and a relatively shallow horizontal plate girder-like structure interconnecting said rigid end structures.

12. A tractor unit having dual power plants, an underframe therefor including, as the principal longitudinal members thereof, a pair of beams continuous from end to end of the unit and spaced from each other and from the side walls of the unit and adapted adjacent the opposite ends thereof, which ends are vertically deeper than their intermediate portions, to support the power plants, transverse bolster members adjacent said opposite ends extending across and connecting said spaced beams and extending outwardly beyond said beams to the side walls of the unit, and transverse plate means connecting the lower portions of said beams substantially throughout the lengths thereof.

13. A locomotive for high-speed, light-weight trains of the class described which comprises a double end underframe, each end of which is adapted to support a power plant and has means to support the underframe end on a truck, said power plant supporting means including, as principal longitudinal members of the underframe extending substantially the entire length thereof, a pair of longitudinally extending and, at their end portions, relatively high web beam members arranged inwardly of the side walls of the locomotive, and intermediate these end portions relatively low beam members composing a center sill portion interconnecting the end portions, the center sill portion having the longitudinal members thereof transversely interconnected by a plate to form therewith a wide vertically shallow plate girder construction adapted to take longitudinal buffer and traction loads, and transmit such loads between the vertically deep end portions of the underframe.

ALBERT G. DEAN.